(12) United States Patent
Shimohata et al.

(10) Patent No.: US 9,085,673 B2
(45) Date of Patent: Jul. 21, 2015

(54) ANILINE BLACK HAVING SPECIFIC SULFUR CONTENT, AND RESIN COMPOSITION AND WATER-BASED AND SOLVENT-BASED DISPERSIONS USING THE ANILINE BLACK

(75) Inventors: Yusuke Shimohata, Otake (JP); Kohei Uehara, Otake (JP); Nobuya Shimo, Otake (JP); Koso Aoki, Otake (JP)

(73) Assignee: TODA KOGYO CORPORATION, Otake (JP)

( * ) Notice: Subject to any disclaimer, the term of this patent is extended or adjusted under 35 U.S.C. 154(b) by 200 days.

(21) Appl. No.: 13/979,958

(22) PCT Filed: Jan. 19, 2012

(86) PCT No.: PCT/JP2012/051077
§ 371 (c)(1),
(2), (4) Date: Aug. 23, 2013

(87) PCT Pub. No.: WO2012/099204
PCT Pub. Date: Jul. 26, 2012

(65) Prior Publication Data
US 2013/0330556 A1    Dec. 12, 2013

(30) Foreign Application Priority Data
Jan. 21, 2011   (JP) ................................. 2011-011309

(51) Int. Cl.
| | | |
|---|---|---|
| C09C 1/44 | (2006.01) | |
| C08K 5/41 | (2006.01) | |
| C08K 5/42 | (2006.01) | |
| B32B 5/16 | (2006.01) | |
| C08K 5/3465 | (2006.01) | |
| C09D 11/00 | (2014.01) | |
| C08L 79/02 | (2006.01) | |
| C08L 101/00 | (2006.01) | |
| C09D 5/02 | (2006.01) | |
| C09D 7/12 | (2006.01) | |
| C09D 11/328 | (2014.01) | |
| C09D 11/037 | (2014.01) | |
| C09D 11/322 | (2014.01) | |
| C09B 67/46 | (2006.01) | |
| C09B 67/00 | (2006.01) | |
| C08K 5/00 | (2006.01) | |

(52) U.S. Cl.
CPC .............. *C08K 5/3465* (2013.01); *C08L 79/02* (2013.01); *C08L 101/00* (2013.01); *C09B 67/009* (2013.01); *C09B 67/0086* (2013.01); *C09B 68/22* (2013.01); *C09D 5/028* (2013.01); *C09D 7/1266* (2013.01); *C09D 7/1275* (2013.01); *C09D 11/00* (2013.01); *C09D 11/037* (2013.01); *C09D 11/322* (2013.01); *C09D 11/328* (2013.01); *C08K 5/0041* (2013.01); *Y10T 428/2982* (2015.01)

(58) Field of Classification Search
CPC ........................ Y10T 428/25; Y10T 428/2982
USPC ........... 428/402; 252/500; 524/609; 106/473, 106/493, 498, 506
See application file for complete search history.

(56) References Cited

U.S. PATENT DOCUMENTS

| | | | |
|---|---|---|---|
| 5,354,816 A | | 10/1994 | Shimizu et al. |
| 5,780,572 A | * | 7/1998 | Graham ........................ 528/210 |
| 5,782,968 A | * | 7/1998 | Hirayama et al. ............ 106/476 |
| 6,395,809 B1 | * | 5/2002 | Hayashi et al. ................ 524/89 |
| 6,524,383 B2 | | 2/2003 | Komatsu et al. |
| 2003/0131761 A1 | | 7/2003 | Hayashi et al. |
| 2007/0149658 A1 | | 6/2007 | Hayashi et al. |
| 2011/0065844 A1 | | 3/2011 | Hayashi et al. |

FOREIGN PATENT DOCUMENTS

| | | |
|---|---|---|
| CN | 1990609 | 7/2007 |
| CN | 101845235 | 9/2010 |
| JP | 5-178989 | 7/1993 |
| JP | 10-245497 | 9/1998 |
| JP | 2000-072974 | 3/2000 |
| JP | 2001-261989 | 9/2001 |
| JP | 2002-060647 | 2/2002 |
| JP | 2002-327144 | 11/2002 |
| JP | 2003-327866 | 11/2003 |
| WO | WO 01/62862 A1 | 8/2001 |

OTHER PUBLICATIONS

International Search Report for PCT/JP2012/051077 mailed Apr. 17, 2012.
"Synthesis and Physical Properties of Highly Sulfonated Polyaniline", Journal of American Chem. Soc., 1996, vol. 118, pp. 2545-2555.
Wei et al, "Synthesis and Physical Properties of Highly Sulfonated Polyaniline", J. Am. Chem. Soc. 1996, 118, 2545-2555.

* cited by examiner

*Primary Examiner* — Holly Le
(74) *Attorney, Agent, or Firm* — Nixon & Vanderhye P.C.

(57) ABSTRACT

The present invention provides aniline black comprising no harmful substances such as chromium and copper in its products and having an excellent blackness and a high resistivity value, as well as provides a black resin composition, a water-based dispersion and a solvent-based dispersion which are colored with the aniline black and have an excellent dispersibility. The aniline black according to the present invention has a sulfur content of 0.2 to 6.0% by weight and comprises primary particles having an average major axis diameter of 0.05 to 0.80 μm.

10 Claims, No Drawings

ANILINE BLACK HAVING SPECIFIC SULFUR CONTENT, AND RESIN COMPOSITION AND WATER-BASED AND SOLVENT-BASED DISPERSIONS USING THE ANILINE BLACK

This application is the U.S. national phase of International Application No. PCT/JP2012/051077 filed 19 Jan. 2012 which designated the U.S. and claims priority to JP 2011-011309 filed 21 Jan. 2011, the entire contents of each of which are hereby incorporated by reference.

TECHNICAL FIELD

The present invention provides aniline black comprising sulfur derived from a sulfone group and having an excellent blackness.

Also, the present invention provides a resin composition and water-based and solvent-based dispersions which are colored by the aniline black and have an excellent dispersibility.

BACKGROUND ART

The aniline black is a black dye or pigment obtained by oxidation polycondensation of an aromatic amine such as aniline, toluidine and phenylene diamine, and can exhibit a bluish black color which cannot be given by carbon black. The aniline black has been used in various applications including coating materials, printing inks, paints, poster colors, plastics, thermal transfer inks or the like because of a jet-black color inherent thereto. An optimum method for production of the aniline black using an oxidizing agent is the method using a bichromate as the oxidizing agent.

However, the bichromate comprises chromium ions as a pollutant extremely harmful to human body (currently, it is recognized that chromium contained in the aniline black which is coordinated to a dyestuff is safe and harmless because it comprises no toxic hexavalent chromium), and copper ions derived from a copper salt used as a catalyst are also a harmful substance. Therefore, there is an increasing demand for aniline black which can be produced without using any of these harmful substances and is free from such a risk that these harmful substances are included therein.

Conventionally, as to the aniline black comprising no harmful substances such as chromium and copper, there are known the method of producing aniline black which is characterized by oxidizing aniline in the form of an acid aqueous solution thereof with a persulfate (Patent Document 1), and the method of producing aniline black by oxidizing aniline with an OH radical as an oxidizing agent which is generated using hydrogen peroxide and a metal or a metal salt capable of acting as a catalyst for decomposition of the hydrogen peroxide (Patent Documents 2 and 3).

In addition, as a n electron conjugated polymer exhibiting a high blackness and having a highly controlled particle diameter, there is known a black pigment obtained by subjecting a water-soluble high-molecular weight compound, a transition metal compound and a protonic acid to oxidation polymerization using an oxidizing agent(Patent Document 4).

On the other hand, with respect to a polyaniline well known as a conductive polymer, there have been recently proposed a water-soluble sulfonated polyaniline capable of exhibiting a conductivity without addition of a doping agent thereto, and a method for synthesis of the polyaniline. For example, there are known a method of sulfonating a polyaniline with fuming sulfuric acid (Non-Patent Document 1), a method of sulfonating a copolymerized product obtained from aniline and aminobenzenesulfonic acid or a derivative thereof (Patent Document 5), or the like.

In addition, as a black colorant for a non-magnetic developer for electrophotography and a black matrix for liquid crystal displays, there have been used carbon blacks most of which are inexpensive and exhibit an excellent tinting power. In recent years, it has been demanded to attain a high quality of electrophotographic images and a high light-shielding rate of the black matrix. For this reason, studies have been made on increase in concentration of the colorant in the developer or black matrix by increasing an amount of the colorant added thereto. However, the carbon black tends to be hardly dispersed in a binder resin and the obtained resin composition tends to exhibit a low volume resistivity value. As a result, in the case of the former developer, there tends to occur such a problem that the obtained developer tends to be deteriorated in charging performance (deteriorated in charge retention capability). Also, in the case of the latter black matrix, there tends to occur such a problem that since it is difficult to impart a good dispersion stability to a dispersion of the carbon black, the dispersion tends to have a poor fluidity and therefore the resulting black matrix as a resist thin film tends to exhibit a low volume resistivity value.

In general, it is known that the aniline black has a high volume resistivity value as compared to inorganic black pigments such as carbon black. Therefore, to solve the above conventional problems, the use of the aniline black in the above applications has been proposed. With respect to the black colorant for a non-magnetic developer for electrophotography, there has been proposed the use of aniline black as a developer capable of exhibiting a less leakage of charge even under high-temperature and high-humidity conditions and having an excellent charge retention performance (Patent Documents 6 and 7).

Further, there is also known a colorant used in a black matrix for liquid crystal displays which is obtained by coating carbon black with a resin to impart a good dispersion stability and a good fluidity to the carbon black when used in the form of a dispersion thereof (Patent Document 8).

PRIOR ART DOCUMENTS

Patent Documents

Patent Document 1: Japanese Patent Application Laid-Open (KOKAI) No. 2001-261989
Patent Document 2: Japanese Patent Application Laid-Open (KOKAI) No. 10-245497
Patent Document 3: Japanese Patent Application Laid-Open (KOKAI) No. 2000-72974
Patent Document 4: Japanese Patent Application Laid-Open (KOKAI) No. 9-31353
Patent Document 5: Japanese Patent Application Laid-Open (KOKAI) No. 5-178989
Patent Document 6: Japanese Patent Application Laid-Open (KOKAI) No. 2010-19970
Patent Document 7: Japanese Patent Application Laid-Open (KOKAI) No. 2005-195693
Patent Document 8: Japanese Patent Application Laid-Open (KOKAI) No. 2001-106938

Non-Patent Document

Non-Patent Document 1: "J. Am. Chem. Soc.", 1996, vol. 118, p 2545

SUMMARY OF THE INVENTION

Problem to be Solved by the Invention

At present, it has been required to provide aniline black comprising no harmful substances such as chromium and copper which can exhibit an excellent blackness and a high volume resistivity value (hereinafter referred to merely as a "resistivity value"), as well as a resin composition, a water-based dispersion and a solvent-based dispersion which are colored with the aniline black and exhibit an excellent dispersibility. However, the aniline black capable of satisfying the above requirements has not been obtained until now.

The aniline black described in the above Patent Document 1 has a low sulfur content and a poor dispersibility as shown in the below-mentioned Comparative Examples and therefore may fail to exhibit a sufficient blackness, and further tends to have a relatively low resistivity value such as $10^5$ Ω·cm.

The aniline blacks described in the above Patent Documents 2 and 3 have a low sulfur content and a poor dispersibility as shown in the below-mentioned Comparative Examples and therefore may fail to exhibit a sufficient blackness.

The black pigment described in the above Patent Document 4 has a high sulfur content as shown in the below-mentioned Comparative Examples, but tends to exhibit a greenish hue and a low dispersibility and therefore may fails to exhibit a sufficient blackness, and further tends to have a relatively low resistivity value such as $10^4$ Ω·cm.

The sulfonated polyanilines described in the above Non-Patent Document 1 and Patent Document 5 have a high sulfur content, but tends to exhibit a greenish hue and therefore may fail to exhibit a sufficient blackness. In addition, the polyanilines exhibit a peculiar conductivity and therefore tends to hardly exhibit a high resistivity value.

In consequence, an object of the present invention is to provide aniline black having an excellent blackness and a high resistivity value as well as a black resin composition, a water-based dispersion and a solvent-based dispersion which are colored with the aniline black and have an excellent dispersibility.

Means for Solving the Problem

The above object or technical task of the present invention can be achieved by the following aspects of the present invention.

That is, according to the present invention, there is provided aniline black having a sulfur content of 0.2 to 6.0% by weight and comprising primary particles having an average major axis diameter of 0.05 to 0.80 μm (Invention 1).

Also, according to the present invention, there is provided the aniline black as described in the above Invention 1, wherein an aspect ratio (average major axis diameter/average minor axis diameter) of the primary particles of the aniline black is 1.0 to 1.7 (Invention 2).

Also, according to the present invention, there is provided the aniline black as described in the above Invention 1 or 2, wherein the aniline black has a powder pH value of 3.0 to 8.0 (Invention 3).

Also, according to the present invention, there is provided the aniline black as described in any one of the above Inventions 1 to 3, wherein the aniline black has a volume resistivity value of not less than $10^6$ Ω·cm (Invention 4).

Also, according to the present invention, there is provided the aniline black as described in any one of the above Inventions 1 to 4, wherein among respective hue values L*, a* and b* as measured with respect to the aniline black, the lightness (L* value) thereof is not more than 10.5 (Invention 5).

In addition, according to the present invention, there is provided a resin composition comprising the aniline black as described in any one of the above Inventions 1 to 5 (Invention 6).

Further, according to the present invention, there is provided a water-based dispersion comprising the aniline black as described in any one of the above Inventions 1 to 5 (Invention 7).

Furthermore, according to the present invention, there is provided a solvent-based dispersion comprising the aniline black as described in any one of the above Inventions 1 to 5 (Invention 8).

Furthermore, according to the present invention, there is provided a process for producing aniline black comprising the steps of:

preparing an acid aqueous solution of an aniline salt which is rendered water-soluble with an acid;

adding a metal or a metal salt capable of acting as a decomposition catalyst for an oxidizing agent to the acid aqueous solution of the aniline salt to prepare a mixed solution;

while stirring the mixed solution, adding dropwise the oxidizing agent thereto to subject the aniline salt to oxidation polymerization, thereby producing aniline black; and then neutralizing the resulting reaction solution with an alkali agent, followed by subjecting the neutralized product to filtration, washing with water and drying, in which the acid aqueous solution of the aniline salt comprises a sulfonyl compound represented by the following general formula (I):

$$Ar\text{—}SO_3H \quad (I)$$

wherein Ar represents an aryl group which may be substituted with a hydroxyl group or a carboxyl group (Invention 9).

Also, according to the present invention, there is provided the process for producing aniline black as described in the above Invention 9, wherein in the step of adding the metal or metal salt capable of acting as a decomposition catalyst for the oxidizing agent, after previously preparing a uniform aqueous solution of the metal or metal salt capable of acting as a decomposition catalyst for the oxidizing agent, the aqueous solution of the metal or metal salt is added dropwise simultaneously with the dropwise addition of the oxidizing agent to the acid aqueous solution of the aniline salt (Invention 10).

Effect of the Invention

The aniline black according to the present invention exhibits an excellent blackness and a high resistivity value, and therefore can be suitably used as a black pigment.

The aniline black according to the present invention is excellent in dispersibility in resins and various solvents, and therefore can be suitably used as a coloring pigment for a resin composition, a water-based dispersion and a solvent-based dispersion.

PREFERRED EMBODIMENTS FOR CARRYING OUT THE INVENTION

The construction of the present invention is described in more detail below.

First, the aniline black according to the present invention is described.

The sulfur content of the aniline black according to the present invention is in the range of 0.2 to 6.0% by weight.

When the sulfur content is less than 0.2% by weight, the aniline black tends to have a poor dispersibility and therefore tends to be deteriorated in blackness in come cases. On the other hand, the aniline black having a sulfur content of more than 6.0% by weight tends to be hardly industrially produced. The sulfur content of the aniline black is preferably in the range of 0.5 to 5.0% by weight. Meanwhile, the sulfur contained in the aniline black means sulfur bonded to a molecular skeleton of the aniline black, and does not mean a sulfur compound included as an impurity therein.

The average major axis diameter of primary particles of the aniline black according to the present invention is in the range of 0.05 to 0.80 µm. When the average major axis diameter of primary particles of the aniline black is less than 0.05 µm, the aniline black tends to have a poor dispersibility and therefore tends to be deteriorated in blackness. On the other hand, when the average major axis diameter of primary particles of the aniline black is more than 0.80 µm, the aniline black tends to have a low tinting power and therefore tends to be deteriorated in blackness. The average major axis diameter of primary particles of the aniline black is preferably in the range of 0.10 to 0.50 µm.

The aspect ratio (average major axis diameter/average minor axis diameter) of primary particles of the aniline black according to the present invention is preferably in the range of 1.0 to 1.7. When the aspect ratio is more than 1.7, the aniline black tends to have a poor dispersibility and therefore tends to be deteriorated in blackness. The aspect ratio of primary particles of the aniline black is more preferably in the range of 1.0 to 1.5.

The powder pH value of the aniline black according to the present invention is preferably in the range of 3.0 to 8.0 and more preferably 3.5 to 7.5. Meanwhile, the powder pH value may be measured by the method described in Examples below.

The resistivity value (volume resistivity value) of the aniline black according to the present invention is preferably not less than $10^6$ Ω·cm. When the resistivity value of the aniline black is less than $10^6$ Ω·cm, a resin composition comprising the aniline black also tends to exhibit a relatively low resistivity value. The resistivity value of the aniline black is more preferably not less than $10^7$ Ω·cm and still more preferably $5 \times 10^7$ to $1 \times 10^{12}$ Ω·cm.

An excellent blackness of the aniline black means that among the hue values of the aniline black, the lightness (L* value) thereof is not more than 10.5 as measured by the evaluation method described in Examples below. When the L* value is more than 10.5, the aniline black tends to hardly exhibit an excellent blackness. The L* value of the aniline black is preferably not more than 10.0 and more preferably 3 to 9.5.

Next, the process for producing the aniline black according to the present invention is described.

The aniline black according to the present invention is produced as follows. That is, an acid aqueous solution of an aniline salt which is rendered water-soluble with an acid is prepared. Then, a metal or a metal salt capable of acting as a decomposition catalyst for an oxidizing agent is added to the acid aqueous solution of the aniline salt to prepare a mixed solution. While stirring the mixed solution, the oxidizing agent is added dropwise thereto to subject the aniline salt to oxidation polymerization, thereby producing aniline black. Next, the resulting reaction solution is neutralized with an alkali agent, followed by subjecting the neutralized product to filtration, washing with water and drying, and then to pulverization. In the above process, the acid aqueous solution of the aniline salt comprises a sulfonyl compound represented by the following general formula (I), whereby it is possible to produce a sulfur-containing aniline black. Meanwhile, the metal or metal salt capable of acting as the decomposition catalyst may be previously dissolved in water to prepare a uniform aqueous solution thereof, and then the aqueous solution may be added dropwise to the acid aqueous solution of the aniline salt simultaneously with the dropwise addition of the oxidizing agent.

wherein Ar represents an aryl group (for example, a phenyl group, a tolyl group, a xylyl group, a mesityl group, a naphthyl group, a biphenyl group or the like). The aryl group may be substituted with a substituent group such as a hydroxyl group, a carboxyl group or the like.

Examples of the acid used for preparing the acid aqueous solution include hydrochloric acid, sulfuric acid, tetrafluoroboric acid, perchloric acid and periodic acid. These acids may be used alone or in the form of a mixture of any two or more thereof. Meanwhile, the concentration of the acid in the acid aqueous solution may vary depending upon the kind of acid used therein, and is usually about 1 to about 20% and preferably 2 to about 15%.

Specific examples of the sulfonyl compound represented by the general formula (I) include benzene-sulfonic acid and p-toluene-sulfonic acid. These sulfonyl compounds may be used alone or in the form of a mixture of any two or more thereof. The amount of the sulfonyl compound added is preferably 1 to 50% based on the acid.

The time of adding the sulfonyl compound represented by the general formula (I) is not particularly limited. The sulfonyl compound may be allowed to be present in the reaction solution before adding the oxidizing agent thereto. For example, there may be used the method of adding the sulfonyl compound together with the inorganic acid, the method of adding the sulfonyl compound after dissolving aniline with the inorganic acid, or the like.

Examples of the oxidizing agent include persulfates such as ammonium persulfate, sodium persulfate and potassium persulfate, and hydrogen peroxide. These oxidizing agents may be used alone or in the form of a mixture of any two or more thereof. The amount of the oxidizing agent used is 0.1 to 10 mol and preferably 0.5 to 5 per 1 mol of the aniline.

In the present invention, the oxidizing agent is preferably gradually added to the reaction solution. By thus adding the oxidizing agent over a certain period of time, it is possible to well control a rate of the oxidation polymerization, which is preferred from the viewpoint of controlling a particle diameter of the obtained aniline black to a suitable range.

Examples of the metal or metal salt capable of acting as a decomposition catalyst for the oxidizing agent include iron, ferric chloride, ferric nitrate, ferric sulfate, ferrous chloride, ferrous nitrate, ferrous sulfate, platinum chloride, gold chloride and silver nitrate. These metals or metal salts may be used alone or in the form of a mixture of any two or more thereof. The catalyst may be usually used in an amount of about 0.01 to about 1 mol and preferably about 0.02 to about 0.5 mol per 1 mol of the aniline.

The metal or metal salt capable of acting as a decomposition catalyst for the oxidizing agent as used in the present invention is preferably gradually added to the reaction solution. By thus adding the oxidizing agent over a certain period of time, it is possible to well control a rate of decomposition of the oxidizing agent, which is preferred from the viewpoint of controlling an aspect ratio of the obtained aniline black to a suitable range.

In the present invention, the oxidizing agent may be usually added over a period of 10 min to 10 hr and preferably 20 min to 5 hr.

In the present invention, it is more preferred that the decomposition catalyst for the oxidizing agent is added simultaneously with the oxidizing agent in the oxidation polymerization step, since it becomes possible to readily control the rate of decomposition of the oxidizing agent.

The reaction temperature used in the present invention is not particularly limited, and the reaction may be usually conducted at a temperature of 10 to 70° C. and preferably 20 to 60° C.

In the present invention, after adding the oxidizing agent, the resulting reaction solution is preferably stirred for a period of usually 10 min to 10 hr and preferably 20 min to 5 hr.

The slurry obtained by the oxidation polymerization exhibits a strong acidity and therefore is treated with an alkali agent to adjust a pH value thereof to the range of 5 to 10 and preferably 6 to 9. If required, the slurry may be further heated while stirring at a temperature of 20 to 95° C. for a period of 30 min to 1 hr.

The alkali agent may be either an inorganic compound or an organic compound. Examples of the inorganic compound include alkali metal hydroxides such as sodium hydroxide and potassium hydroxide, and carbonates such as sodium carbonate. Examples of the organic compound include trialkanol amines such as triethanol amine and triisopropanol amine.

After neutralizing the slurry with the alkali agent, the resulting reaction mixture is subjected to filtration, washing with water and then drying by ordinary methods, followed, if required, by pulverizing the resulting dried product into particles having a predetermined particle diameter, thereby obtaining the aniline black as aimed.

Next, the resin composition according to the present invention is described.

The lightness (L* value) of the resin composition according to the present invention as a hue value thereof measured by the below-mentioned evaluation method is not more than 10.5 and therefore is excellent in blackness as compared to those using conventionally known aniline blacks. In view of good blackness, the L* value of the resin composition is preferably not more than 10.0. In addition, as a result of visually observing the resin composition, the dispersibility of the aniline black in the resin composition is in the range of Rank 4 or Rank 5 as measured by the below-mentioned evaluation method.

Next, the process for producing the resin composition according to the present invention is described.

The content of the aniline black in the resin composition according to the present invention is in the range of 0.01 to 200 parts by weight based on 100 parts by weight of a constituting base material of the resin composition. In view of a handling property of the resulting resin composition, the content of the aniline black in the resin composition is preferably 0.05 to 100 parts by weight and more preferably 0.1 to 50 parts by weight.

The constituting base material of the resin composition according to the present invention comprises the aniline black and a known thermoplastic resin, if required, together with various additives such as a lubricant, a plasticizer, an antioxidant, an ultraviolet absorber and various stabilizers.

The amount of the additives added is not more than 50% by weight based on a total amount of the aniline black and the thermoplastic resin. When the amount of the additives added is more than 50% by weight, the resulting resin composition tends to be deteriorated in moldability.

The resin composition according to the present invention is produced and used as follows. That is, the resin raw material and the aniline black are previously intimately mixed with each other, and then a strong shear force is applied to the resulting mixture under heating using a kneader or an extruder to break aggregates of the aniline black and uniformly disperse the aniline black in the rubber or resin. Thereafter, the resulting resin composition may be crushed or molded upon use into a desired shape according to the aimed applications.

Next, the water-based dispersion and the solvent-based dispersion according to the present invention are described.

The particle diameter of the particles dispersed in the water-based dispersion according to the present invention may be controlled such that a cumulative 90% particle diameter thereof as calculated from a particle size distribution thereof in terms of number of the particles (hereinafter referred to merely as "d90") is not more than 400 nm and preferably not more than 300 nm. In addition, the particle diameter of the particles dispersed in the water-based dispersion may also be controlled such that a cumulative 50% particle diameter thereof as calculated from a particle size distribution thereof in terms of number of the particles (hereinafter referred to merely as "d50") is not more than 300 nm and preferably not more than 200 nm.

The viscosity of the water-based dispersion according to the present invention is controlled to not more than 12.0 mPa·s and preferably not more than 10.0 mPa·s. When the viscosity of the water-based dispersion is more than 12.0 mPa·s, the water-based dispersion tends to be deteriorated in blackness. The lower limit of the viscosity of the water-based dispersion is about 1.0 mPa·s.

The storage stability of the water-based dispersion according to the present invention may be controlled such that the rate of change in viscosity thereof as measured by the below-mentioned evaluation method is preferably less than ±10%, more preferably not more than ±6% and still more preferably not more than ±5%.

The viscosity of the solvent-based dispersion according to the present invention is controlled to not more than 15.0 mPa·s and preferably not more than 12.0 mPa·s. When the viscosity of the solvent-based dispersion is more than 15.0 mPa·s, the solvent-based dispersion tends to be deteriorated in blackness. The lower limit of the viscosity of the solvent-based dispersion is about 2.0 mPa·s.

The particle diameter of the particles dispersed in the solvent-based dispersion according to the present invention may be controlled such that a cumulative 90% particle diameter thereof as calculated from a particle size distribution thereof in terms of number of the particles (hereinafter referred to merely as "d90") is not more than 600 nm and preferably not more than 500 nm. In addition, the particle diameter of the particles dispersed in the solvent-based dispersion may also be controlled such that a cumulative 50% particle diameter thereof as calculated from a particle size distribution thereof in terms of number of the particles (hereinafter referred to merely as "d50") is not more than 400 nm and preferably not more than 300 nm.

The storage stability of the solvent-based dispersion according to the present invention may be controlled such that the rate of change in viscosity thereof as measured by the below-mentioned evaluation method is preferably less than ±15%, more preferably not more than ±12% and still more preferably not more than ±10%.

Next, the processes for producing the water-based dispersion and the solvent-based dispersion according to the present invention are described.

The content of the aniline black used in the water-based dispersion according to the present invention is in the range of 0.1 to 200 parts by weight based on 100 parts by weight of a constituting base material thereof. In view of a handling property of the resulting water-based dispersion, the content of the aniline black in the water-based dispersion is preferably 0.1 to 100 parts by weight and more preferably 0.1 to 50 parts by weight.

The constituting base material of the respective dispersions according to the present invention may comprise a resin, a solvent and, if required, an optional component such as an extender pigment, a drying accelerator, a surfactant, a curing accelerator and other assistants.

As the resins for the solvent-based dispersion, there may be used various resins ordinarily used for solvent-based dispersions, such as acrylic resins, alkyd resins, polyester resins, polyurethane resins, epoxy resins, phenol resins, melamine resins, amino resins or the like. As the resins for the water-based dispersion, there may be used various resins ordinarily used for water-based dispersions, such as water-soluble alkyd resins, water-soluble melamine resins, water-soluble acrylic resins, water-soluble urethane emulsion resins or the like.

As the solvent for the solvent-based dispersion, there may be used those solvents ordinarily used for solvent-based dispersions. Examples of the solvent for the solvent-based dispersion include toluene, xylene, butyl acetate, methyl acetate, methyl isobutyl ketone, butyl cellosolve, ethyl cellosolve, butyl alcohol, aliphatic hydrocarbons or the like.

As the solvent for the water-based dispersion, there may be used those solvents ordinarily used in the form of a mixture with water. Examples of the solvent for the water-based dispersion include butyl cellosolve, butyl alcohol or the like.

Examples of the defoaming agent include commercially available products such as "NOPCO 8034 (tradename)", "SN DEFOAMER 477 (tradename)", "SN DEFOAMER 5013 (tradename)", "SN DEFOAMER 247 (tradename)" and "SN DEFOAMER 382 (tradename)" all produced by Sun Nopco Co., Ltd., and "ANTI-FOAM 08 (tradename)" and "EMULGEN 903 (tradename)" both produced by Kao Corp.

<Function>

According to the present invention, it has been found that there exists a close relationship between a blackness, a dispersibility and a sulfur content of the aniline black.

The reason why the aniline black according to the present invention comprises sulfur is suggested by the present inventors as follows. That is, when the aniline and the sulfonyl compound are subjected to copolymerization reaction in the oxidation polymerization reaction step, sulfone group-containing particles are produced.

In addition, it is suggested by the present inventors that when the catalyst is added simultaneously with the oxidizing agent in the oxidation polymerization reaction step, it is possible to optionally control the rate of decomposition of the oxidizing agent and thereby well control the rate of the oxidization polymerization reaction, so that the resulting aniline black is reduced in aspect ratio of primary particles thereof (i.e., a ratio of an average major axis diameter to an average minor axis diameter of the primary particles), and is further enhanced in dispersibility, resulting in excellent blackness of the aniline black.

The aniline black according to the present invention is excellent in blackness and dispersibility and has a high resistivity value, and therefore can be suitably used as a colorant for electrophotographic toners and a colorant for black matrixes, and further is usefully employed in the form of a resin composition and a water-based or solvent-based dispersion which comprise the aniline black.

EXAMPLES

Typical examples of the present invention are as follows.

The content of sulfur in the aniline black was determined by measuring an amount of sulfur therein using "Horiba Metal Carbon/Sulfur Measuring Device E MIA-2200 Model" manufactured by Horiba Seisakusho Co., Ltd.

The average major axis diameter and the average minor axis diameter of primary particles of the aniline black were determined as follow. That is, the major axis diameters and minor axis diameters of 350 particles observed in an electron micrograph were respectively measured to calculate an average value thereof.

The aspect ratio was expressed by an average value of the aspect ratios of the average major axis diameter to the average minor axis diameter as described above.

The powder pH value was determined as follows. That is, 5 g of a sample were weighed and charged into a 300 mL conical flask, and then 100 mL of boiled pure water were added thereto. The contents of the flask were heated and held in a boiled state for about 5 min, and then the flask was closed with a plug, followed by allowing the contents of the flask to stand for cooling down to a normal temperature. Then, an amount of water corresponding to a reduced amount of the water boiled out was added to the flask, and after closing the flask with a plug again, the contents of the flask were shaken for 1 min and allowed to stand for 5 min. Thereafter, the pH value of the resulting supernatant liquid was measured according to JIS Z8802-7. The thus measured pH value was regarded as the powder pH value.

The volume resistivity value of the aniline black was measured as follows. That is, first, particles of the aniline black were weighed in an amount of 0.5 g and then subjected to press molding under a pressure of $1.372 \times 10^7$ Pa (140 kg/cm$^2$) using a KBr tablet machine (manufactured by Shimadzu Corp.) to produce a cylindrical sample to be measured.

Next, the resulting sample to be measured was set between stainless steel electrodes, and then an electric voltage of 15 V was applied thereto using an electric resistance measuring apparatus "Model 4329A" manufactured by Yokogawa-Hokushin Electric Co., Ltd., to thereby measure a resistivity value R (Ω) thereof.

Next, the (cylindrical) sample to be measured was subjected to measurement of an upper surface area A (cm$^2$) and a thickness t0 (cm) thereof, and a volume resistivity value (Ω·cm) of the sample was calculated from the measured values according to the following formula 1.

$$\text{Volume resistivity value}(\Omega\cdot\text{cm}) = R \times (A/t0) \qquad \text{<Formula 1>}$$

The dispersibility of the aniline black according to the present invention was determined as follows. That is, the dispersion prepared in the below-mentioned Example 13 was applied onto a cast-coated paper using a bar coater capable of applying a wet coating film with a thickness of 24 μm to form a coating film piece (having a coating film thickness of about 6 μm) to examine a gloss of a coated surface of the coating film piece.

The gloss of the aniline black was measured using a gloss meter "UGV-5D" (manufactured by Suga Test Instruments Co., Ltd.) to measure a 45° gloss value thereof. The higher the gloss value, the more excellent the dispersibility of the aniline black became.

The lightness (L* value) of the aniline black according to the present invention was determined as follows. That is, the dispersion prepared in the below-mentioned Example 13 was applied onto a cast-coated paper using a bar coater capable of applying a wet coating film with a thickness of 24 μm to form a coating film piece (having a coating film thickness of about 6 μm). The thus formed coating film piece was measured with respect to its lightness (L* value) as a hue value thereof using a spectroscopic colorimeter "X-Rite 939" (manufactured by X-Rite Corp.) according to JIS Z8729.

The lightness (L* value) of the resin composition comprising the aniline black according to the present invention was determined as follows. That is, a resin plate having the below-mentioned composition was measured with respect to its lightness (L* value) as a hue value thereof using a spectroscopic colorimeter "X-Rite 939" (manufactured by X-Rite Corp.) according to JIS Z8729.

The dispersibility of the aniline black in the resin composition was evaluated as follows. That is, the number of aggregated particles which were present in an undispersed state on the surface of the resulting resin composition was counted by visual observation, and the dispersibility of the particles was evaluated according to the following five ratings. The Rank 5 represents a most excellent dispersing condition of the aniline black in the resin composition.

Rank 5: No undispersed particles were observed. Rank 4: 1 to 4 undispersed particles were observed per 1 cm$^2$.

Rank 3: 5 to 9 undispersed particles were observed per 1 cm$^2$.

Rank 2: 10 to 49 undispersed particles were observed per 1 cm$^2$.

Rank 1: Not less than 50 undispersed particles were observed per 1 cm$^2$.

The dispersibility of the aniline black in the resin composition according to the present invention is preferably Rank 4 or 5 among the above five ratings and more preferably Rank 5.

The particle diameter of the particles dispersed in the water-based dispersion was measured using a fiber-optics particle analyzer "FPAR-1000" manufactured by Otsuka Electronics Co., Ltd., and expressed by a cumulative 50% particle diameter (d50) and a cumulative 90% particle diameter (d90) both calculated from a particle size distribution thereof in terms of number of the particles.

The storage stability of the water-based dispersion was evaluated as follows. That is, an initial viscosity of the dispersion and a viscosity thereof after the elapse of one week at 25° C. were measured using an E-type viscometer "TV-30" manufactured by Toki Sangyo Co., Ltd. The rate of change in viscosity of the water-based dispersion from the initial viscosity to the viscosity after the elapse of time was calculated according to the following formula 2, and the storage stability of the water-based dispersion was evaluated according to the following five ratings.

[Rate of change in viscosity]=([Viscosity after the elapse of time]−[Initial viscosity])/[Initial viscosity]×100  <Formula 2>

A: The rate of change in viscosity was less than ±5%.
B: The rate of change in viscosity was not less than ±5% and less than ±10%.
C: The rate of change in viscosity was not less than ±10% and less than ±30%.
D: The rate of change in viscosity was not less than ±30% and less than ±50%.
E: The rate of change in viscosity was not less than ±50%.

The storage stability of the solvent-based dispersion was evaluated as follows. That is, an initial viscosity of the dispersion and a viscosity thereof after the elapse of one week at 25° C. were measured using an E-type viscometer "TV-30" manufactured by Toki Sangyo Co., Ltd. The rate of change in viscosity of the solvent-based dispersion from the initial viscosity to the viscosity after the elapse of time was calculated according to the following formula 3, and the storage stability of the solvent-based dispersion was evaluated according to the following four ratings.

[Rate of change in viscosity]=([Viscosity after the elapse of time]−[Initial viscosity])/[Initial viscosity]×100  <Formula 3>

A: The rate of change in viscosity was less than ±10%.
B: The rate of change in viscosity was not less than ±10% and less than ±15%.
C: The rate of change in viscosity was not less than ±15% and less than ±30%.
D: The rate of change in viscosity was not less than ±30% and less than ±50%.

<Production of Aniline Black>

Example 1

Thirty grams (0.32 mol) of aniline were added to 33.8 g (0.33 mol) of 35% hydrochloric acid and 1250 mL of water, and then while stirring and mixing the resulting mixture at a liquid temperature of 60° C., 15.0 g (0.086 mol) of 4-hydroxybenznesulfonic acid were added thereto and uniformly dissolved therein. Then, a solution prepared by dissolving 4.6 g (0.0363 mol) of ferrous chloride in 70 mL of water and 78.0 g (0.69 mol) of 30% hydrogen peroxide were added dropwise into the resulting solution over 2 hr. Thereafter, the resulting mixture was stirred and mixed at a liquid temperature of 60° C. for 1 hr to terminate the reaction. After completion of the reaction, the resulting reaction solution was subjected to filtration and then washing with water, and the resulting filter cake was re-dispersed in 1000 mL of water. The obtained dispersion was neutralized with 10% sodium hydroxide to adjust a pH value thereof to 6.5. After stabilizing the pH value, the resulting reaction solution was subjected to filtration and washing with water, and the obtained paste was dried at 60° C., thereby obtaining aniline black (black pigment-1).

As a result of subjecting the thus obtained aniline black to FT-IR measurement by KBr tablet method, a peak was observed in the vicinity of 1070 to 1030 cm$^{-1}$, and it was therefore confirmed that a sulfone group was present in the aniline black.

Examples 2 to 4

The same procedure as in Example 1 was conducted except that the amount of water, the kind and amount of acid added, the kind and amount of catalyst added and addition method of the catalyst, the kind and amount of oxidizing agent added and addition method of the oxidizing agent, the reaction time and aging time, and the pH value upon neutralization were changed variously, thereby obtaining aniline blacks.

The production conditions are shown in Table 1, and the properties of the thus obtained aniline blacks are shown in Table 2.

As a result of subjecting the aniline blacks thus obtained in Examples 2 to 4 to FT-IR measurement by KBr tablet method, a peak was observed in the vicinity of 1070 to 1030 cm$^{-1}$, and it was therefore confirmed that a sulfone group was present in each of the aniline blacks.

Comparative Example 1

Thirty grams (0.32 mol) of aniline were added to 15.8 g (0.11 mol) of 71% sulfuric acid, 31.8 g (0.32 mol) of 35% hydrochloric acid and 200 mL of water, and dissolved therein while stirring. Then, a solution prepared by dissolving 9.6 g (0.0240 mol) of ferrous sulfate in 90 mL of water was added into the resulting solution at one time. While stirring and mixing the resulting mixture at a liquid temperature of 30° C., 78.0 g (0.69 mol) of 30% hydrogen peroxide were added dropwise into the resulting solution over 2 hr. Thereafter, the resulting mixture was stirred and mixed at a liquid temperature of 30° C. for 4 hr to terminate the reaction. After completion of the reaction, the resulting reaction solution was subjected to filtration and then washing with water, and the resulting filter cake was re-dispersed in 1000 mL of water. The obtained dispersion was neutralized with 10% sodium hydroxide to adjust a pH value thereof to 9.0. After stabilizing the pH value, the resulting reaction solution was subjected to filtration and washing with water, and the obtained paste was dried at 60° C., thereby obtaining aniline black (black pigment-5).

The production conditions are shown in Table 1, and the properties of the thus obtained aniline black are shown in Table 2.

Comparative Example 2

Follow-Up Test of Example 5 of Japanese Patent Application Laid-Open (KOKAI) No. 2001-261989

Thirty grams (0.32 mol) of aniline were dissolved in 600 mL (0.31 mol) of a 5.1% sulfuric acid aqueous solution, and 7.8 g (0.0289 mol) of ferrous chloride hexahydrate were added to the resulting solution at one time. Further, a solution prepared by dissolving 144 g (0.63 mol) of ammonium persulfate in 600 mL of water was added dropwise into the obtained solution at 40° C. over 15 min, followed by heating the obtained reaction solution to a temperature of 70 to 75° C. and stirring the reaction solution at that temperature for 1 hr. After completion of the reaction, insoluble components were removed by filtration from the reaction solution and washed with water, and then the obtained cake was slurried again in 900 mL of water. The resulting slurry was treated with a 10% sodium hydroxide aqueous solution to adjust a pH value thereof to 7, followed by heating the thus obtained solution at 90° C. for 30 min while stirring. Then, insoluble components were removed by filtration from the resulting reaction solution, and the resulting cake was washed with water and then dried, thereby obtaining aniline black (black pigment-6).

The production conditions are shown in Table 1, and the properties of the thus obtained aniline black are shown in Table 2.

Comparative Example 3

Follow-Up Test of Example 1 of Japanese Patent Application Laid-Open (KOKAI) No. 2000-72974

Thirty grams (0.32 mol) of aniline were added to 18.0 g (0.11 mol) of 62% sulfuric acid, 31.8 g (0.32 mol) of 35% hydrochloric acid and 300 mL of water, and dissolved therein while stirring. Then, a solution prepared by dissolving 13.2 g (0.0869 mol) of ferrous sulfate in 60 mL of water was added into the resulting solution at one time. While stirring and mixing the resulting mixture at a liquid temperature of 15° C., 90.0 g (0.79 mol) of 30% hydrogen peroxide were added into the resulting solution over 4 hr. Thereafter, the resulting mixture was stirred and mixed at a liquid temperature of 15° C. for 4 hr to terminate the reaction. After completion of the reaction, the resulting reaction solution was subjected to filtration and then washing with water, and the resulting filter cake was re-dispersed in 960 mL of water. The obtained dispersion was neutralized with 10% sodium hydroxide to adjust a pH value thereof to 7. After stabilizing the pH value, the resulting reaction solution was subjected to filtration and washing with water, and the obtained paste was dried at 60° C., thereby obtaining aniline black (black pigment-7).

The production conditions are shown in Table 1, and the properties of the thus obtained aniline black are shown in Table 2.

Comparative Example 4

Follow-Up Test of Example 4 of Japanese Patent Application Laid-Open (KOKAI) No. 9-31353(1997)

The reaction vessel was charged with 540 g of ion-exchanged water, 30 g (0.170 mol) of 4-methyl benzene-sulfonic acid, 15 g (0.0004 mol) of 1% ferrous sulfate and 350 g of a 10% aqueous solution of polyisoprene sodium sulfonate (molecular weight: 30000) prepared by previously dissolving the polyisoprene sodium sulfonate in water, and the contents of the reaction vessel were intimately stirred and mixed with each other. Next, 33.8 g (0.33 mol) of 35% hydrochloric acid and 30 g (0.32 mol) of aniline were charged into the reaction vessel. While maintaining the reaction temperature at 20° C., 360 parts (0.53 mol) of a 5% hydrogen peroxide aqueous solution were continuously added into the reaction vessel over 2 hr, and the contents of the reaction vessel were further stirred over 2 hr, followed by subjecting the resulting reaction solution to filtration and washing with water. The resulting paste was dried at 60° C., thereby obtaining a black pigment (black pigment-8).

The production conditions are shown in Table 1, and the properties of the thus obtained black pigment are shown in Table 2.

TABLE 1

| | Production conditions of aniline black Examples | | | |
|---|---|---|---|---|
| | 1 | 2 | 3 | 4 |
| Water | 1250 mL | 200 mL | 2500 mL | 2500 mL |
| Acid 1 | HCl | HCl | HCl | HCl |
| | 0.33 mol | 0.32 mol | 0.33 mol | 0.32 mol |
| Acid 2 | — | $H_2SO_4$ | — | $H_2SO_4$ |
| | | 0.11 mol | | 0.11 mol |
| Sulfonyl compound | 4-hydroxy-benzene-sulfonic acid | Benzene-sulfonic acid | Naphthalene-2-sulfonic acid | 2-Methyl phenol-sulfonic acid |
| | 0.086 mol | 0.032 mol | 0.057 mol | 0.007 mol |
| Aniline | 0.32 mol | 0.32 mol | 0.32 mol | 0.32 mol |
| Catalyst | $FeCl_2$ | $Fe_2(SO_4)_3$ | $FeCl_3$ | $FeCl_2$ |
| | 0.0363 mol | 0.0240 mol | 0.0592 mol | 0.0197 mol |
| Addition method of catalyst | Added dropwise over 2 hr | Added dropwise over 2 hr | Added dropwise over 4 hr | Added dropwise over 1 hr |
| Oxidizing agent | $H_2O_2$ | $H_2O_2$ | $(NH_4)_2S_2O_8$ | $H_2O_2$ |
| | 0.69 mol | 0.69 mol | 0.79 mol | 0.69 mol |
| Addition method of oxidizing agent | Added dropwise over 2 hr | Added dropwise over 2 hr | Added dropwise over 4 hr | Added dropwise over 1 hr |
| Temp. (° C.) | 60 | 30 | 40 | 50 |
| Aging time (hr) | 1 | 4 | 3 | 2 |
| Neutralization pH (—) | 6.5 | 9.0 | 8.0 | 7.0 |

TABLE 1-continued

Production conditions of aniline black
Comparative Examples

| | 1 | 2 | 3 | 4 |
|---|---|---|---|---|
| Water | 200 mL | 600 mL | 300 mL | 540 mL |
| Acid 1 | HCl | $H_2SO_4$ | HCl | HCl |
| | 0.32 mol | 0.31 mol | 0.32 mol | 0.32 mol |
| Acid 2 | $H_2SO_4$ | — | $H_2SO_4$ | 4-Methyl-benzene-sulfonic acid |
| | 0.11 mol | | 0.11 mol | 0.170 mol |
| Sulfonyl compound | — | — | — | — |
| Aniline | 0.32 mol | 0.32 mol | 0.32 mol | 0.32 mol |
| Catalyst | $Fe_2(SO_4)_3$ | $FeCl_3 \cdot 6H_2O$ | $FeSO_4$ | $Fe_2(SO_4)_3$ |
| | 0.0240 mol | 0.0289 mol | 0.0869 mol | 0.0004 mol |
| Addition method of catalyst | Added at one time | Added at one time | Added at one time | Added at one time |
| Oxidizing agent | $H_2O_2$ | $(NH_4)_2S_2O_8$ | $H_2O_2$ | $H_2O_2$ |
| | 0.69 mol | 0.63 mol | 0.79 mol | 0.53 mol |
| Addition method of oxidizing agent | Added dropwise over 2 hr | Added dropwise over 15 min | Added dropwise over 4 hr | Added dropwise over 2 hr |
| Temp. (° C.) | 30 | 40 | 15 | 20 |
| Aging time (hr) | 4 | 1 | 4 | 2 |
| Neutralization pH (—) | 9.0 | 7.0 | 7.0 | — |

TABLE 2

Properties of aniline black

| Examples and Comp. Examples | Sulfur content (wt %) | Major axis diameter (μm) | Aspect ratio (—) | Powder pH (—) |
|---|---|---|---|---|
| Example 1 | 4.70 | 0.25 | 1.49 | 3.6 |
| Example 2 | 1.50 | 0.66 | 1.68 | 7.4 |
| Example 3 | 1.90 | 0.11 | 1.09 | 6.0 |
| Example 4 | 0.25 | 0.09 | 1.17 | 4.4 |
| Comp. Example 1 | 0.06 | 0.75 | 1.60 | 5.8 |
| Comp. Example 2 | 0.15 | 0.36 | 1.80 | 5.8 |
| Comp. Example 3 | 0.10 | 0.39 | 1.84 | 4.0 |
| Comp. Example 4 | 6.40 | 0.11 | 2.07 | 2.9 |

Properties of aniline black

| Examples and Comp. Examples | Volume resistivity (Ω·cm) | 45° Gloss (%) | Lightness L* (—) |
|---|---|---|---|
| Example 1 | 1.E+09 | 33 | 7.2 |
| Example 2 | 2.E+07 | 23 | 9.0 |
| Example 3 | 1.E+10 | 31 | 4.0 |
| Example 4 | 9.E+08 | 21 | 5.6 |
| Comp. Example 1 | 1.E+07 | 14 | 11.0 |
| Comp. Example 2 | 2.E+05 | 3 | 18.4 |
| Comp. Example 3 | 2.E+06 | 5 | 12.5 |
| Comp. Example 4 | 4.E+04 | 4 | 21.3 |

<Production of Resin Composition>

Example 5

The aniline black obtained in Example 1 and polyvinyl chloride resin particles "103EP8D" (produced by Zeon Corp.) were weighed in amounts of 1.5 g and 48.5 g, respectively, and charged into a 10 cc polymeric beaker. The contents of the beaker were intimately mixed with each other using a spatula, thereby obtaining mixed particles.

The resulting mixed particles were mixed with 0.5 g of calcium stearate, and the obtained mixture was slowly kneaded between heat rolls heated to 160° C. which were so adjusted as to have a clearance of 0.2 mm therebetween, and the kneading was continued until obtaining a uniform resin composition. The resulting resin composition was peeled off from the rolls and used as a raw material for production of a colored resin plate.

Next, the resin composition was sandwiched between stainless steel plates having a polished surface and then placed in a hot press heated to 180° C. to subject the resin composition to press molding under a pressure of 1 ton/cm², thereby obtaining a colored resin plate having a thickness of 1 mm.

The resulting colored resin plate had an L* value of 7.2 and a dispersing condition of Rank 5.

Examples 6 to 8 and Comparative Examples 5 to 8

The same procedure as in Example 5 was conducted except that the kind of aniline black was changed variously, thereby obtaining resin compositions.

The properties of the thus obtained resin compositions are shown in Table 3.

TABLE 3

| | | Resin composition | |
|---|---|---|---|
| Examples and Comp. Examples | Aniline black used | Dispersing condition (—) | Lightness L* (—) |
| Example 5 | Example 1 | 5 | 7.2 |
| Example 6 | Example 2 | 4 | 9.3 |
| Example 7 | Example 3 | 5 | 4.0 |
| Example 8 | Example 4 | 5 | 5.6 |
| Comp. Example 5 | Comp. Example 1 | 3 | 11.3 |
| Comp. Example 6 | Comp. Example 2 | 2 | 21.5 |
| Comp. Example 7 | Comp. Example 3 | 2 | 14.3 |
| Comp. Example 8 | Comp. Example 4 | 1 | 22.0 |

<Production of Water-Based Dispersion>

Example 9

A 140 mL glass bottle was charged with 7.50 g of the aniline black particles obtained in Example 1 together with the other paint components at the following compounding ratio, and the contents of the glass bottle were mixed and dispersed with 50 g of 1.5 mmϕ glass beads using a paint shaker for 60 min, thereby producing a black paint.

The composition of the resulting water-based dispersion was as follows.

| | |
|---|---|
| Aniline black | 7.50 parts by weight |
| Anionic surfactant ("HITENOL NF-08" produced by DAIICHI KOGYO SEIYAKU CO., LTD.) | 1.30 parts by weight |
| Styrene-acryl copolymer ("JONCRYL63J" produced by BASF AG) | 10.00 parts by weight |
| Defoaming agent ("EnviroGem AD-01" produced by Nissin Chemical Industry Co., Ltd.) | 0.20 part by weight |
| Water | 31.00 parts by weight |

The particle diameters (d50) and (d90) of particles dispersed in the resulting water-based dispersion were 123 nm and 175 nm, respectively. Also, the viscosity of the water-based dispersion was 5.6 mPa·s, and the storage stability thereof was Rank A.

Examples 10 to 12 and Comparative Examples 9 to 12

The same procedure as in Example 9 was conducted except that the kind of aniline black was changed variously, thereby obtaining water-based dispersions.

The properties of the thus obtained water-based dispersions are shown in Table 4.

TABLE 4

| Examples and Comp. Examples | Aniline black used | Properties of water-based dispersion | | | |
|---|---|---|---|---|---|
| | | Particle diameter of particles dispersed | | Viscosity (mPa·s) | Storage stability |
| | | d50 (nm) | d90 (nm) | | |
| Example 9 | Example 1 | 123 | 175 | 5.6 | A |
| Example 10 | Example 2 | 130 | 295 | 6.0 | A |
| Example 11 | Example 3 | 114 | 158 | 4.8 | A |
| Example 12 | Example 4 | 122 | 166 | 7.8 | A |
| Comp. Example 9 | Comp. Example 1 | 248 | 349 | 10.6 | B |
| Comp. Example 10 | Comp. Example 2 | 303 | 427 | 24.8 | D |
| Comp. Example 11 | Comp. Example 3 | 187 | 263 | 22.6 | D |
| Comp. Example 12 | Comp. Example 4 | 273 | 358 | 16.8 | B |

<Production of Solvent-based Dispersion>

Example 13

A 140 mL glass bottle was charged with 7.50 g of the aniline black particles obtained in Example 1 together with the other components for solvent-based dispersion at the following compounding ratio, and the contents of the glass bottle were mixed and dispersed with 50 g of 1.5 mmφ glass beads using a paint shaker for 60 min, thereby producing a solvent-based dispersion.

The composition of the resulting solvent-based dispersion was as follows.

| | |
|---|---|
| Aniline black | 7.50 parts by weight |
| Polymer dispersant ("PB822" produced by Ajinomoto Fine-Techno Co., Inc.) | 2.00 parts by weight |
| Styrene-acryl copolymer ("JONCRYL680" produced by BASF AG) | 3.00 parts by weight |
| Propylene glycol 1-monomethyl ether 2-acetate | 37.50 parts by weight |

The particle diameters (d50) and (d90) of particles dispersed in the resulting solvent-based dispersion were 269 nm and 344 nm, respectively. Also, the viscosity of the solvent-based dispersion was 7.6 mPa·s, and the storage stability thereof was Rank A.

Examples 14 to 16 and Comparative Examples 13 to 16

The same procedure as in Example 13 was conducted except that the kind of aniline black was changed variously, thereby obtaining solvent-based dispersions.

The properties of the thus obtained solvent-based dispersions are shown in Table 5.

The solvent-based dispersion obtained in Comparative Examples 13 to 16 had a poor dispersion stability and therefore were unstable in scattering intensity, so that it was not possible to measure a particle diameter of particles dispersed therein.

TABLE 5

| Examples and Comparative Examples | Aniline black used | Properties of solvent-based dispersion | | | |
|---|---|---|---|---|---|
| | | Particle diameter of particles dispersed | | Viscosity (mPa·s) | Storage stability |
| | | d50 (nm) | d90 (nm) | | |
| Example 13 | Example 1 | 269 | 344 | 7.6 | A |
| Example 14 | Example 2 | 288 | 396 | 9.7 | A |
| Example 15 | Example 3 | 197 | 271 | 8.8 | A |
| Example 16 | Example 4 | 298 | 411 | 10.6 | A |
| Comp. Example 13 | Comp. Example 1 | Not measurable | | 14.2 | B |
| Comp. Example 14 | Comp. Example 2 | Not measurable | | 30.4 | D |
| Comp. Example 15 | Comp. Example 3 | Not measurable | | 23.3 | D |
| Comp. Example 16 | Comp. Example 4 | Not measurable | | 21.4 | B |

INDUSTRIAL APPLICABILITY

The aniline black according to the present invention exhibits an excellent blackness, a high resistivity value and an excellent dispersibility, and therefore can be suitably used for a resin composition and water-based and solvent dispersions and can be usefully employed in the applications of chemical and electronic equipments using a paint, an ink, an ink-jet ink, a toner, a resist or the like.

The invention claimed is:

1. Aniline black having a sulfur content of 0.2 to 6.0% by weight and comprising primary particles having an average major axis diameter of 0.05 to 0.80 μm.

2. The aniline black according to claim 1, wherein an aspect ratio (average major axis diameter/average minor axis diameter) of the primary particles of the aniline black is 1.0 to 1.7.

3. The aniline black according to claim 1, wherein the aniline black has a powder pH value of 3.0 to 8.0.

4. The aniline black according to claim 1, wherein the aniline black has a volume resistivity value of not less than $10^6$ Ω·cm.

5. The aniline black according to claim 1, wherein among respective hue values L*, a* and b* as measured with respect to the aniline black, the lightness (L* value) thereof is not more than 10.5.

6. A resin composition comprising the aniline black as defined in claim 1.

7. A water-based dispersion comprising the aniline black as defined in claim 1.

8. A solvent-based dispersion comprising the aniline black as defined in claim 1.

9. A process for producing aniline black comprising the steps of:
preparing an acid aqueous solution of an aniline salt which is rendered water-soluble with an acid;

adding a metal or a metal salt capable of acting as a decomposition catalyst for an oxidizing agent to the acid aqueous solution of the aniline salt to prepare a mixed solution;

while stirring the mixed solution, adding dropwise the oxidizing agent thereto to subject the aniline salt to oxidation polymerization, thereby producing aniline black; and then neutralizing the resulting reaction solution with an alkali agent, followed by subjecting the neutralized product to filtration, washing with water and drying, in which the acid aqueous solution of the aniline salt comprises a sulfonyl compound represented by the following general formula (I):

$$Ar-SO_3H \qquad (I)$$

wherein Ar represents an aryl group which may be substituted with a hydroxyl group or a carboxyl group.

10. The process for producing aniline black according to claim 9, wherein in the step of adding the metal or metal salt capable of acting as a decomposition catalyst for the oxidizing agent, after previously preparing a uniform aqueous solution of the metal or metal salt capable of acting as a decomposition catalyst for the oxidizing agent, the aqueous solution of the metal or metal salt is added dropwise simultaneously with the dropwise addition of the oxidizing agent to the acid aqueous solution of the aniline salt.

* * * * *